Patented May 25, 1926.

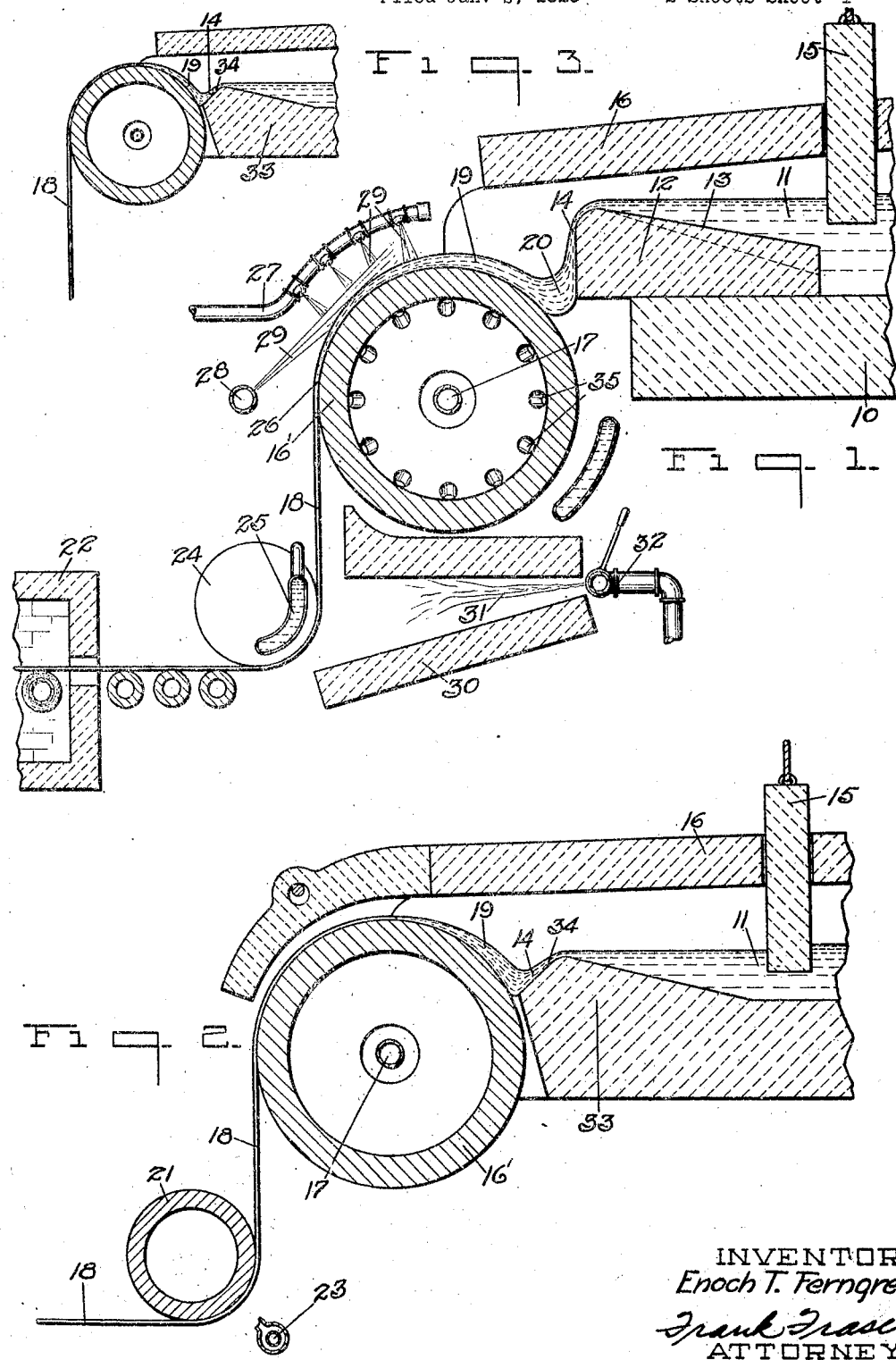

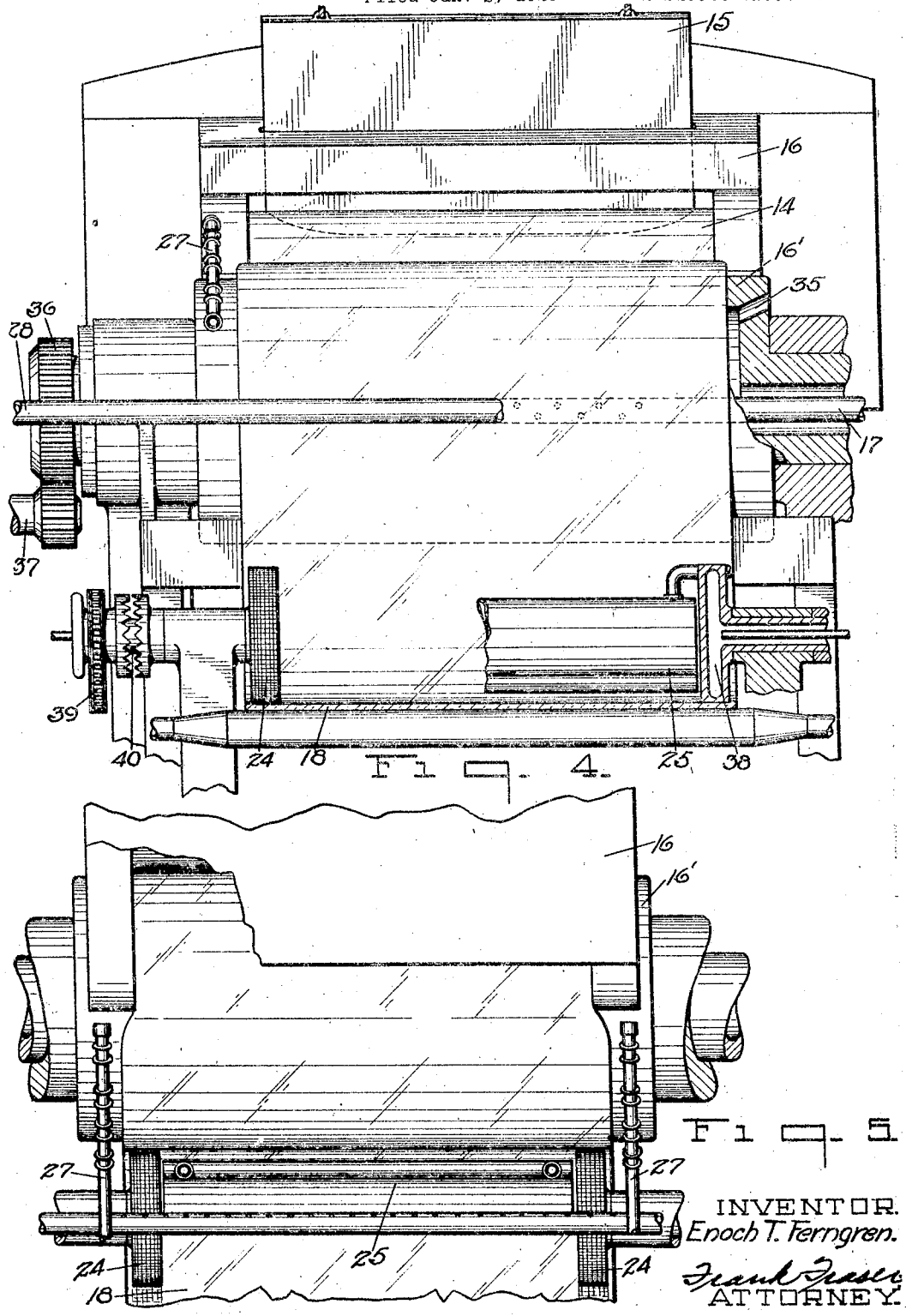

1,586,187

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR PRODUCING SHEET GLASS.

Application filed January 2, 1925. Serial No. 92.

The present invention relates to a method and apparatus for drawing sheet glass, and has particular reference to means whereby a quantity of molten glass is deposited upon a rotatable drum to form a sheet source from which the glass is drawn in sheet form.

The purpose of this invention is to form a constant sheet source of molten glass which is movable in unit formation toward the point of draw where its forward end is drawn into sheet formation, with the object in view of increasing production with simplified means, while reducing costs and overhead expense, and to attain by the practice of the methods as hereinafter disclosed a uniformly flat and evenly tempered sheet of glass.

An important object of the invention is to provide a method and apparatus for producing sheet glass wherein a relatively broad and shallow stream of glass is flowed from a supply onto a relatively large circular drum or roll at a point to the side of the top curvature of the vertical center of the roll, the said drum being rotated to carry the depositing glass forward with the periphery of the drum where the glass is permitted to descend and leave the roll at the vertical tangent line with the periphery thereof in sheet form.

A further object of the invention is to provide a method and apparatus for producing sheet glass wherein a rotary drum is employed, the walls of the drum being maintained at a temperature calculated to normally progressively cool that surface of the fluent glass which is in direct contact with the surface of the drum to progressively produce a semi-plastic film on the body of glass formed by the depositing stream as it contacts with the drum surface, the said film surface on the glass gradually becoming tougher as it is carried forward toward the tangent line of descent of the glass from the roll where the film is also increased in thickness by reason of the cooling influence of the roll extending through the film to the adjacent glass which will progressively build up a relatively thick plastic skin toward the upper surface of the glass as it is carried forward by the drum's rotation.

A still further object of the invention is to provided a method and apparatus whereby a quantity of molten glass is continuously flowed from a suitable source upon a rotatable drum in a manner that the main supply of glass deposited upon the drum will have a tendency to flow in a direction opposite to that of rotation of said drum in a manner that a smooth flat sheet of glass can be drawn from the mass of glass present upon said drum.

One practical advantage of this method resides in that the stretching and tapering source body formed has a constant unit movement in the direction of draw which is independent of the drawing force and which may be made speedy or slow according to the requirements for a thick or thin sheet, but which movement insures a constant progressive using up of all glass comprising the source body, causing same to be always composed of a freshly depositing glass flow.

Other objects and advantages of the invention will become apparent during the course of the following description.

In the drawings wherein like numerals are employed to designate like parts throughout the same, Fig. 1 is a fragmentary longitudinal vertical section through one form of apparatus.

Fig. 2 is a similar section of a slightly modified construction wherein the sheet is adapted to be run off into a horizontal plane.

Fig. 3 is a construction illustrating the sheet as being carried off in a vertical position, Fig. 4 is an end elevation of the apparatus disclosed in Fig. 1, and Fig. 5 is a top plan view thereof.

Heretofore rotatable drums or rolls have been employed in the manufacture of sheet glass, but the present invention distinguishes from the prior art constructions in that the sheet is drawn from a constantly maintained uniform supply body present on the roll which is being constantly bodily moved toward the point of draw, whereas in the prior art the sheet has been formed before coming in contact with the roll, or by rolling a glass flow to sheet thickness between rollers.

In other words, in the present invention a stream of molten glass is continuously flowed upon a rotatable drum in a manner that the sheet source itself is present upon the drum so that the action of the drawing stress and the formation of the sheet takes place entirely after the glass has been deposited upon the drum.

In the drawings wherein for the purposes of illustration is shown the preferred embodiment of the invention, the numeral 10 designates a tank furnace adapted to contain a supply of molten glass 11. Arranged in the discharge end of the tank furnace 10 is a lip or slab 12 forming the bottom of a glass discharging passage and having the inclined surface 13 toward the side walls of the passage to provide for a greater depth of glass. The glass 11 is adapted to flow over the lip or slab 12 in a relatively thin stream 14. A shear-cake 15 is adjustably operable through the cover-tile 16 and is adapted to be submerged in the mass of glass 11 to control the flow thereof over the lip 12.

The slab 12 may be relatively thicker in its center portion than at the edge portions to facilitate equalizing of the stream flow over the edge thereof in a manner that the relatively thin stream 14 will be of an equal temperature and have an equal stream flow velocity throughout its entire width, thus depositing an even stream upon the rotatable drum 16.

As is shown in Fig. 1, the drum 16, which is carried upon the rotatable shaft 17, is disposed below and in advance of the lip 12 so that the glass 14 will be deposited upon the drum to one side of the vertical axes thereof. The sheet 18 is drawn from the sheet source 19 which has been deposited upon the drum.

The stream of glass which is continuously deposited upon the upper rear surface of the drum 16 ceases to be a stream and becomes a plastic sheet source 19 in which exists a certain degree of easy fluency at the point where it is replenished by the stream 14, and slightly forward of this point in the direction of rotation of the large drum, where the glass will actually flow in the opposite direction of rotation of the large roll or drum as it is being carried forward, so that at all times there will build up a relatively thick body of molten glass 20 which is bodily in a state of descending motion along the curved surface of the roll in opposite direction to its rotation.

This movement of the body of glass at the point where it is replenished by the stream 14 provides a downwardly bulging mass of glass on the rear end of the sheet source body slightly rearwardly of the point where the stream from the supply joins and feeds the said sheet source, which bulging surface is constantly brought into contact with the advancing surface of the roll and carried forward and upward with the roll or drum 16 during its rotation, while a certain portion of the supply body, because of its fluency, is constantly flowing backwards as it is being moved along the curve of the roll toward the upper point of the roll surface. The lower portion of the sheet source body which forms the contacting surface with the roll will move with the roll in close contact therewith, which contact almost excludes air between the glass and the roll so that an actual semi-vacuum grip is established between the glass and the roll 16 at this stage of transit of the lower surface of the contacting glass, while as before stated the body portion of the source body which is not chilled to the same extent as the lower surface, is still free to flow as influenced by gravity, the angle of supporting surface and the speed of movement given to the roll or drum.

While the sheet source body is chiefly carried forward by the rotation of the drum 16 it will maintain its greater bulk at the point 20 where the glass stream joins the same, and it is principally the inner portion of its body that will move in the opposite direction to the rotation of the roll. The progressive cooling effect of the drum 16 will form a skin which will tightly hug the drum while the glass adjacent to this skin will be more fluent and will in a way be acted upon by the forces of gravity.

As the forward end of the body is carried by the roll to the drop off point which is preferably the vertical tangent line at the forward end of the roll, drawing force is applied to this glass, and thus while being brought forward mechanically the glass at this side of the roll is also advanced through the stretching or attenuation of its body by the drawing force.

The mechanical arrangement for communicating drawing force may comprise any of the well-known forms of construction, and as is shown in Fig. 2, the sheet 18 is passed over a bending roll 21 to deflect the sheet 18 into a horizontal plane whereby it may be run through a suitable flattening table and annealing leer 22. To assist the sheet 18 in passing over the bending roll 21 a gas burner 23 may be employed as illustrated, and if desired a fire polish may be given to the sheet at the bending point.

In Fig. 3 the sheet 18 is shown as being carried off in a vertical position.

An excellent method for producing sheet glass by this improved process and without the use of a bending roll is shown in Fig. 1, wherein the sheet 18 passes over the rolls 24, which, as shown in Figs. 4 and 5, contact only with the border portions of said sheet. These rolls 24 are used for bending the sheet from the vertical to the horizontal plane in a manner that the border portions only come in contact with any surface so that there is no possibility of marring the sheet during the bending operation.

To assist in bending the sheet, a preferably arcuated cooler 25 is disposed in the curve of the sheet as shown in Fig. 1, to absorb sufficient heat from the sheet to give the same sufficient strength to pass over the edge engaging rolls 24 without injury.

As has been pointed out, the lower surface of the body of glass or sheet source will hug the surface of the drum on account of the close contact between the two surfaces and the semi-vacuum condition established between them, but this grip of the roll on the surface of the glass or vice-versa becomes much modified as the lower surface of the source is contracted by chilling during its advancement, which causes the glass to release freely from the highly polished roll surface before reaching the vertical tangent point which is designated broadly at 26 where the sheet area commences and which release is also due to the fact that the stretching action which operates through the lower surface portion of the sheet source body will progresisvely disengage the surface skin thereof from the surface of the roll as the sheet source is continuously moved forward.

The upper surface of the the sheet source body will also sustain quite a percentage of the tension resulting from the drawing operation, which tension extends through said surface to the point at the upper portion of the body where the glass stream may be said to enter the same. The forward movement of the upper layer of the sheet source which is contrary to the opposite movement of the interior body of the sheet source tends to maintain considerable surface tension through said layer which prevents any overlapping by the glass stream at the point where it descends from the supply, its surface also being sufficiently tensioned and pulled in the direction of rotation of the roll and draw of the glass to prevent overlapping, and will present a smooth curve where the stream joins the sheet source body.

The forward portion of the sheet source body may be considerably attenuated and speeded in the direction of draw during the drawing and sheet forming operation, depending on how much resistance to the forward movement of the glass is in effect at the forward end of the source. The degree of resistance present at this end will depend upon the fluency of the glass as one factor and the speed of forward rotation of the roll in the direction of draw as a second factor.

As the glass sheet is drawn downward from the tangent point 26 of the drum 16 along the vertical tangent line, and the source body progressively carried forward to the attenuation zone, it is best to maintain a uniform heat temperature condition around the upper surface of the sheet source body as the chilling imparted by the roll to the body will practically extend clear through its attenuating section at the forward end of the sheet source, and it may even be desirable to employ adjustable heat releasing means for high heating closely adjacent to the point where the sheet leaves the roll.

As is shown in the drawing gas burners 27 and 28 are positioned and adapted to play a flame 29 upon the sheet for the purpose just set forth.

In addition to the cooling element 25 positioned at the bend in the sheet 18 an adjustable heat controlling mechanism 30 is adapted to permit a flame 31 from the burner 32 to play upon the outer previously cooled sheet surface of the bend in said sheet. The simultaneous cooling on the inner side and the heating on the outer side will permit the sheet to be deflected without injury thereto.

In Figs. 2 and 3 is shown a slightly modified form of construction wherein the drum 16 is relatively higher with respect to the discharge slab 33 than in the construction shown in Fig. 1. In this instance the discharge slab 33 has the inclined lip or edge 34 permitting the glass stream 14 to flow upon the drum 16 in a manner that the sheet source 19 will be built up exactly as in the construction in Fig. 1.

As shown in Fig. 1, the drum is provided with ports 35 to permit a blast of air or even a circulation of water through the drum.

The drum is rotated by means of the gearing 36 having connection with the drive shaft 37. The rolls 24 may or may not have a knurled surface for contact with the sheet. The rolls 24 are provided with internal cooling medium passages 38 by which means the cooling medium may be continuously passed through the rolls to assist in chilling the edges. The rolls are rotated by means of the drive 39 including a clutch 40 so that the rolls 24 may be positively driven or may be driven by being in frictional contact with the sheet 18.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a furnace, a mass of molten glass therein, a sheet source, means for moving the sheet source toward the point of draw where a sheet is formed, means for absorbing heat from said sheet at a point where it is to be deflected into a different plane, and means engaging the edges of the sheet at said point.

2. In sheet glass apparatus, a furnace, a mass of molten glass therein, a sheet source, means for moving the sheet source toward the point of draw where a sheet is formed, means engaging the edges of the sheet for deflecting the sheet into a different plane, means for absorbing heat from one side of the sheet, and means for applying heat on the other side thereof to assist in deflecting the sheet.

3. The process of producing sheet glass, consisting in forming a sheet source, mechanically advancing the sheet source, in a direction opposite to the natural flow thereof toward the point of draw, and then drawing a sheet of glass therefrom.

4. In sheet glass apparatus, a furnace containing a mass of molten glass, a rotatable drum, means for permitting a flow of glass to pass from the furnace upon the drum in a manner that it will tend to move on the drum in a direction opposite to its rotation, and means for drawing a sheet from the glass on said drum, the sheet being drawn in the same direction as that of rotation of the said drum.

5. In sheet glass apparatus, a furnace containing a mass of molten glass, a rotatable drum, means for permitting a flow of molten glass to pass from the furnace upon the drum, the flow being introduced upon the drum to one side of the vertical axis thereof and being drawn off in sheet form from a point on the opposite side of the vertical axis of said drum.

6. In sheet glass apparatus, a furnace containing a mass of molten glass, a rotatable drum, means for permitting glass to flow from the furnace upon said drum, and means to draw a sheet therefrom, the flow being deposited on the drum in a manner that there will be movement of the glass in two directions, in one direction with the rotation of said drum, and in the second direction opposite to the rotation thereof, said glass being controlled so that it leaves the drum in one direction only.

Signed at Toledo, in the county of Lucas, and State of Ohio, this 29th day of December, 1924.

ENOCH T. FERNGREN.